United States Patent [19]

Wagner

[11] 4,259,191

[45] Mar. 31, 1981

[54] PROCESS FOR THE PREPARATION OF SULFOBETAINES

[75] Inventor: Helmut Wagner, Ketsch, Fed. Rep. of Germany

[73] Assignee: Th. Goldschmidt AG, Essen, Fed. Rep. of Germany

[21] Appl. No.: 31,520

[22] Filed: Apr. 19, 1979

Related U.S. Application Data

[63] Continuation-in-part of Ser. No. 931,894, Aug. 8, 1978, abandoned.

[51] Int. Cl.³ .................. E21B 43/22; C07C 143/00
[52] U.S. Cl. ........................... 252/8.55 D; 166/275;
                                              252/355; 260/501.12
[58] Field of Search ............... 252/8.55 D; 166/274, 166/275

[56] References Cited

U.S. PATENT DOCUMENTS

| | | | |
|---|---|---|---|
| 2,129,264 | 9/1938 | Downing et al. | 252/356 X |
| 3,469,630 | 9/1969 | Hurd et al. | 166/250 |
| 3,939,911 | 2/1976 | Maddox et al. | 166/274 |
| 4,090,969 | 5/1978 | Koch et al. | 252/8.55 D X |
| 4,130,491 | 12/1978 | Wagner et al. | 252/8.55 D |

OTHER PUBLICATIONS

Parris et al., Article in *Journal of the American Oil Chemists Society*, Vol. 53, Feb. 1976, pp. 60–63.

*Primary Examiner*—Herbert B. Guynn
*Attorney, Agent, or Firm*—Toren, McGeady and Stanger

[57] ABSTRACT

A method for the preparation of sulfobetaines having the general formula

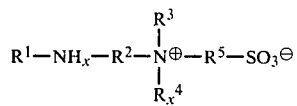

The betaines possess excellent solubilizing and emulsification properties for use in oil recovery.

3 Claims, No Drawings

PROCESS FOR THE PREPARATION OF SULFOBETAINES

CROSS-REFERENCE TO RELATED APPLICATIONS

This is a continuation-in-part of copending application Ser. No. 931,894, filed Aug. 8, 1978, now abandoned, the contents of which are incorporated herein by reference.

BACKGROUND OF THE INVENTION

1. Field of the Invention

The present invention relates to sulfobetaines for use in oil recovery.

2. Description of the Prior Art

The use of betaines for the recovery of oil from oil spills in the sea is known as disclosed in German Offenlegungsschrift No. 25 32 469. Such materials are particularly suitable for this purpose since they can be modified to have a good affinity for mineral oil and mineral oil products so as to readily form emulsions therewith or help to partially solubilize the mineral oil. Also, such materials are uneffected by sea water. However, it is desirable to improve upon the ability of such materials with respect to their solubilizing and emulsification power.

Such betaines have also been used for recovery of oil from oil deposits using conventional flooding techniques as disclosed in U.S. Pat. No. 4,130,491, issued Dec. 19, 1978, the contents of which are incorporated herein by reference.

SUMMARY OF THE INVENTION

We have discovered a new process for the preparation of sulfobetaines of the general formula

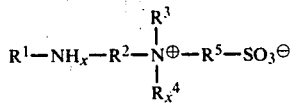

In this general formula, the substituents have the following meaning:

$R_1$ is the naphthenoyl residue derived from naphthenic acid. In the sense of the present invention, naphthenic acids are defined as natural acids, obtained from crude oils and their products by extraction with caustic solution and subsequent acidification. Thus, they are essentially acid mixtures in which, in addition to linear carboxylic acids, especially alkylated cyclopentane carboxylic acids and cyclohexane carboxylic acids predominate. Further details concerning the composition of naphthenic acids can be found on page 192 of the "Erdöl-Lexikon (Mineral Oil Encyclopedia)" by Dr. Alfred Hutig, published by Heidelberg. Those naphthenic acids which have an acid number of 80 to 350, preferably 120 to 250, are especially suitable for the preparation of the betaines which are to be used in accordance with the invention.

$R^2$ is an alkylene residue with 2 to 6 carbon atoms. Preferably the alkylene residue is linear. Residues with 2 to 3 carbon atoms are particularly preferred.

The substituents $R^3$ and $R^4$ may be the same or different and represent a lower, linear alkyl residue with 1 to 4 carbon atoms. The methyl residue is particularly preferred.

$R^5$ is an alkylene residue with 1 to 4 carbon atoms, whereby an alkylene residue with 3 or 4 carbon atoms is especially preferred.

The index x has the value of 0 or 1. If x=0, the quaternary nitrogen atom is connected through an additional $R^2$ group and by ring formation with the first nitrogen atom, which is linked to the carbonyl group of the naphthenic acid. At the same time, $R^2$ preferably is an alkylene group with 2 carbon atoms. In this case, the two nitrogen atoms are constituents of a piperazine ring.

In accordance with the present invention, the preparation of these compounds can be carried out by reacting amino-amides of naphthenic acid of the general formula $$R^1\text{-NH}_x\text{-R}^2\text{-NR}^3R_x^4 \qquad \text{II}$$

(a) with halogenalkylsulfonic acids of the general formula $$X\text{-R}^5\text{-SO}_3H \qquad \text{III}$$

wherein X is a halogen atom, especially the chlorine atom, in the presence of at least equimolar amounts of an alkali hydroxide or alkali carbonate or (b) with alkali salts of the aforementioned halogenalkylsulfonic acids, or (c) propane or butane sultone at temperatures of 50° to 150° C. by known procedures. The aminoamides of naphthenic acids of the general formula $$R^1\text{-NH}_x\text{-R}^2\text{-NR}^3R_x^4 \qquad \text{II}$$

can be prepared by reacting naphthenic acids with an alkylenediamine. The $R^3$ and $R^4$ groups can be introduced into the molecule before or after this reaction.

DESCRIPTION OF THE PREFERRED EMBODIMENTS

In the case of variation (a) of the process, the aminoamide of naphthenic acid having the formula $$R^1\text{-NH}_x\text{-R}^2\text{-NR}^3R_x^4 \qquad \text{II}$$

is reacted with a halogenalkylsulfonic acid of the general formula $$X\text{-R}^5\text{-SO}_3H. \qquad \text{III}$$

the reaction being carried out in the presence of an acid acceptor for the hydrogen halide which is liberated. As the acid acceptor, alkali hydroxide or alkali carbonate are particularly suitable.

In the case of variation (b) of the process, the amino-amides of the naphthenic acid are reacted with the alkali salts of the halogenalkylsulfonic acids mentioned under (a). Alkali halide is precipitated in the reaction and may optionally be allowed to remain in the product. If a solvent is used as the reaction medium, in which the alkali halide formed is not soluble, the salt may be filtered off.

In the case of variation (c) of the process, the amino-amides of the naphthenic acid are reacted with propane or butane sultone. In this case, compounds having the formula

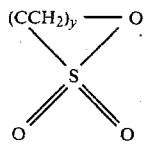

in which y has the value of 3 in the case of propane sultone and the value 4 in the case of butane sultone.

The process of the present invention is preferably carried out in the presence of a polar solvent. This solvent is selected in such a manner that, on the basis of its boiling point, it permits the reaction to be carried out in the desired temperature range and optionally does not dissolve the alkali halide which is formed in variations (a) and (b) of the process. Suitable polar solvents are ketones, especially acetone, ethers, such as, for example, dioxane, and water.

Surprisingly, it turns out that the onset of the reaction can be accelerated significantly if catalytic amounts of quaternary ammonium compounds, such as, for example, trialkylammonium halides or dialkylarylammonium halides are used.

Preferably, however, compounds of formula I are added to the starting materials of the reaction, especially in amounts of 1 percent by weight based on the starting materials.

Reaction times for variations (a) and (b) of the process are clearly longer than those for variations (c) of the process. The reaction with propane or butane sultone is therefore preferred. However, in this case, it is only possible to prepare a sulfobetaine whose $R^5$ residue has 3 or 4 carbon atoms in the alkylene group. In those cases in which sulfobetaines are to be prepared with only 1 or 2 carbon atoms in the $R^5$ group, it is necessary to change over to variations (a) or (b) of the process with the longer reaction times.

The inventively prepared compounds have excellent surface active properties. Because of the naphthenoyl residue, the inventively prepared sulfobetaines have a special affinity for mineral oil and mineral oil products. The inventively prepared sulfobetaines enable very stable mineral oil-water emulsions to be prepared and partially solubilize the mineral oil, while, at the same time, because of their betaine structure, they are largely insensitive to the presence of any salt in the water.

In addition, when present in only very slight concentrations, they lower the interfacial tension between mineral oil and water, especially salt-containing water, for example, between crude oil and water in contact with such oil. Both the good emulsifying and solubilizing properties as well as the great reduction in interfacial tension between water and crude oil at very low concentrations in the ppm range make the inventively prepared compounds into very effective, surface-active substances for the so-called "tertiary oil" recovery.

With the help of compounds prepared pursuant to the present invention, it is possible to activate, free and mobilize for extraction, oil which has remained behind in deposits after conventional methods of extraction have been employed. At the same time, the betaine character of the inventively prepared compounds is of particular importance since the oil emulsion which is formed can be stabilized or broken by selectively changing the pH value. The inventively prepared compounds are compatible with other anionic, cationic or nonionic surfactants, as well as with the conventionally used organic thickening agents.

The object of German Offenlegungsschrift No. 25 32 469 is the use of betaines in oil recovery. In contrast to the betaines of the present invention, which have a sulfo group, the betaines of this Offenlegungsschrift have a carboxyl group which can form an internal salt. However, it has been demonstrated that the emulsifying properties for mineral oil and mineral oil products, even if relatively good, are nevertheless inferior to those of the sulfobetaines prepared pursuant to the present invention. Moreover, in order to reach the minimum in the interfacial tension between the oil and the water in the deposits, it is necessary to use about ten times as much betaine as would be required if the inventively prepared sulfobetaines were used.

Thus, with the present invention, the aqueous flooding solution used for the oil recovery should contain only from about 0.0005 to 5 weight percent based on the total weight of the solution of the betaine.

In the following examples, the inventive preparation of the sulfobetaines is shown first of all in examples 1 to 7. In examples 8 to 11, the emulsifying properties of the inventively prepared sulfobetaines are examined and compared with the products of German Offenlegungsschrift No. 25 32 469. In example 12, the limiting concentration is given with which the maximum reduction in interfacial tension between the crude oil and water in the deposits can be achieved with a compound prepared with the present process. This limiting concentration is compared with that for the compound of Example 1 of German Offenlegungsschrift No. 25 32 469.

EXAMPLE 1

3,190 grams of a crude naphthenic acid (acid number 193) oil content 2.9%; corresponding to a corrected molecular weight of 282) are converted to the amide with 1,380 grams of dimethylaminopropylamine (20% excess) at 200° C. within a period of seven hours. Towards the end of the reaction, when the acid number is less than 8, the product is freed from excess amine by distillation under a vacuum of 10 torr. The yield of the naphthenic acid amide of dimethylaminopropylamine, with a molecular weight of about 366, is about 4,100 grams.

In order to prepare a 30% solution of the betaine, 1,464 grams of this amide were emulsified in 4,556 grams of water and heated with stirring to 50° C. 488 grams of 1,3-propane sultone (3-hydroxy-1-propanesulfonic acid sultone) were added dropwise over a period of two hours. After the dropwise addition of propanesultone is completed, the mixture is reacted for a further five hours at 70° C. to form the betaine.

The product can be characterized by the following formula:

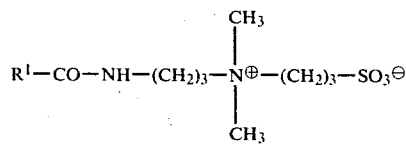

Naphthenyl-1,3-amidopropyldimethylamino-propanesulfonic acid betaine.

EXAMPLE 2

3,135 grams refined naphthenic acid (acid number 205, oil content 8.7% corresponding to a corrected molecular weight of 252) are converted to the amide with 1,530 grams of dimethylaminopropylamine (ca. 20% excess) at 200° C. within a period of seven hours. Towards the end of the reaction, when the acid number is less than 6, the product is freed from excess amine by distilling under a vacuum of 10 torr. The yield of naphthenic acid amide of dimethylaminopropylamine, with a molecular weight of about 336, is about 4,100 grams.

In order to prepare a 30% solution of the betaine, 660 grams of this amide were emulsified in 2,100 grams of water and heated with stirring to 50° C. 340 grams of 1,3-propane sultone (3-hydroxyl-1-propanesulfonic acid sultone) were added dropwise during a period of two hours. After the dropwise addition of propane sultone is completed, the mixture is converted to the betaine by heating for a further 5 hours at 70° C.

The product can be characterized by the following formula:

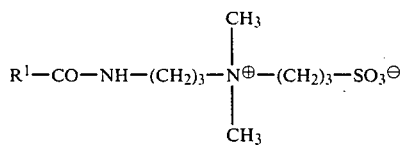

Naphthenyl-1,3-amidopropyldimethylamino-propanesulfonic acid betaine.

EXAMPLE 3

282 grams of a crude naphthenic acid (acid number 193, oil content 2.9%; corresponding to a corrected molecular weight of 282) were converted to the amide with 139.5 grams of 2-amino-1-diethylaminoethane (ca. 20% excess) at 210° C. during a period of five hours. Towards the end of the reaction, when the acid number is less than 5, the product is freed from excess amine by distilling under a vacuum of 12 torr.

The yield of naphthenic acid amide of 2-amino-1-diethylaminoethane with a molecular weight of about 380, is about 375 grams.

In order to prepare a 30% solution of betaine, 113.5 grams of this amide are emulsified in 350 grams of water and heated with stirring to 50° C. 36.5 grams of 1,3-propanesultone (3-hydroxyl-1-propanesulfonic acid sultone) are added dropwise within a period of thirty seconds. After the dropwise addition of propane sultone is completed, the mixture is converted to the sulfobetaine by heating for five hours at 70° C.

The product can be characterized by the following formula:

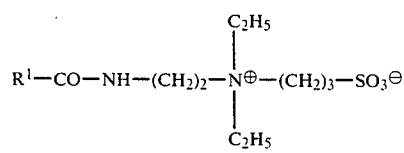

Naphthenyl-1,2-amidoethyldiethylamino-propanesulfonic acid betaine.

EXAMPLE 4

252 grams of a refined naphthenic acid (acid number 205, oil content 8.7%; corresponding to a corrected molecular weight of 252) are converted to the amide with 139.5 grams of 2-amino-1-diethylaminoethane (ca. 20% excess) at 210° C. within a period of five hours. Towards the end of the reaction, when the acid number is less than 4, the product is freed from excess amine by distillation under a vacuum of 12 torr.

The yield of the naphthenic acid amide of 2-amino-1-diethylaminoethane with a molecular weight of about 350 is about 340 grams.

In order to prepare a 30% solution of betaine, 111 grams of this amide were emulsified in 350 grams of water and heated with stirring to 50° C. 39 grams of 1,3-propanesultone (3-hydroxy-1-propanesulfonic acid sultone) were added dropwise within a period of thirty seconds. After the dropwise addition of propane sultone is completed, the mixture is converted to the sulfobetaine by heating for five hours at 70° C.

The product can be characterized by the following formula:

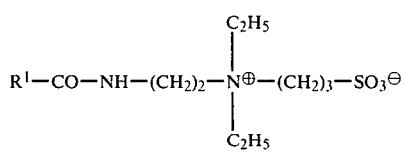

Naphthenyl-1,2-amidoethyldiethylamino-propanesulfonic acid betaine.

EXAMPLE 5

3,190 grams of a crude naphthenic acid (acid number 193, oil content 2,9%; corresponding to a corrected molecular weight of 282) are converted to the amide with 1,380 grams of dimethylaminopropylamine (20% excess) at 200° C. during a period of seven hours. Towards the end of the reaction, when the acid number is less than 8, the product is freed from excess amine by distilling under a vacuum of 10 torr. The yield of the naphthenic acid amide of diethylaminopropylamine, with a molecular weight of about 366, is about 4,100 grams.

In order to prepare a 100% betaine, 33.6 grams of this amide are dissolved in 107.6 grams of anhydrous acetone with boiling under reflux. 12.5 grams of 1,4-butane sultone are added dropwise within twenty seconds. After boiling for five hours under reflux, the acetone is distilled off and the 100% betaine is dried in a hot desiccator.

The product can be characterized by the following formula:

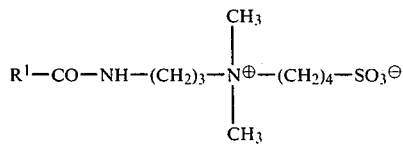

Naphthenyl-1,3-amidopropyldimethylamino-butanesulfonic acid betaine.

EXAMPLE 6

3,135 grams of refined naphthenic acid (acid number 205, oil content 8.7%; corresponding to a corrected molecular weight of 252) are converted to the amide by reaction with 1,530 grams of dimethylaminopropylamine (20% excess) at 200° C. during a period of seven hours. Towards the end of the reaction, when the acid number is less than 6, the product is freed from excess amine by distillation under a vacuum of 10 torr.

The yield of the naphthenic acid amide dimethylaminopropylamine with a molecular weight of about 336, is about 4,100 grams.

In order to prepare a 100% betaine, 30.8 grams of this amide are dissolved in 101 grams of anhydrous acetone under reflux. 12.5 grams of 1,4-butane sultone are added dropwise within ten seconds. After boiling for a further five hours under reflux, the acetone is distilled off and the 100% betaine is dried in a hot desiccator.

The product can be characterized by the following formula:

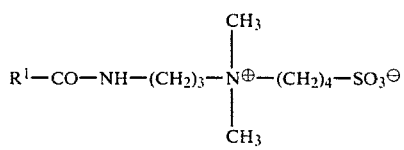

Naphthenyl-1,3-amidopropyldimethylamino-butanesulfonic acid betaine.

EXAMPLE 7

3,135 grams of refined naphthenic acid (acid number 205, oil content 8.7%; corresponding to a corrected molecular weight of 252) are converted to the amide with 1,530 grams of dimethylaminopropylamine (20% excess) at 200° C. during a period of seven hours. Towards the end of the reaction, when the acid number is less than 7, the product is freed from excess amine by distillation under a vacuum of 10 torr.

The yield of the naphthenic acid amide of dimethylaminopropylamine with a molecular weight of about 336 is about 4,100 grams.

In order to prepare an approximately 25% solution betaine, 11.8 grams of the hydrated sodium salt of 2-chloroethanesulfonic acid (98%) are dissolved with stirring in 100 grams of distilled water. After the sodium salt of 2-chloroethanesulfonic acid is completely dissolved, 21 grams of the amide are added slowly dropwise with stirring. After the dropwise addition of the amide is completed, the mixture is boiled under reflux with stirring. The reaction time is 50 hours. At the end of this reaction time, the product is a very clear, brownish liquid, in which none of the components used separate out.

The product can be characterized by the following formula:

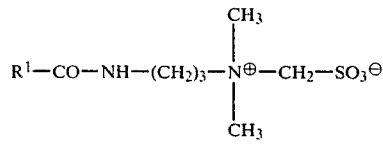

Naphthenyl-1,3-amidopropyldiemethylamino-methanesulfonic acid betaine.

EXAMPLE 8

Two crude oils A and B from the North German region were used for the emulsifying trails. The refractive index at 20° C. is 1.496 for crude oil A and 1.476 for crude oil B. The density at 15° C. is 0.868 g/ml for crude oil A and 0.852 g/ml for crude oil B.

Distilled water or a synthetic formation of simulated sea water was used as aqueous phase. In 100 ml of solution, the simulated sea water contains 11.0 grams of anhydrous calcium chloride,
6.9 grams of magnesium chloride.$6H_2O$ and
182.1 grams of sodium chloride.

In each case, the same amounts of crude oil and water were emulsified. 1% by weight of the betaine, defined in greater detail in the examples, was added to the water. For the emulsification, 110 milliliters of distilled water or of simulated sea water are added to a suitable vessel. The stirrer head of a high-speed stirrer (Ultraturrax Type 18/10; 10,000 rpm) is dipped into the water. With the stirrer running, 110 ml of crude oil A or B are added within 30 seconds. The resultant emulsion is stirred for a further 30 seconds. 100 ml of the emulsion are then poured into a narrow measuring cylinder with ml divisions and the separation of the emulsion is observed at specific time intervals which are given in the examples. It can be seen from the example that more than 50 ml of an aqueous phase separated out at times. This may be explained by assuming that portions of crude oil are contained in the aqueous phase in the form of a microemulsion.

Crude oil B; distilled water; 1 weight % of betaine added; temperature +25° C.

| | Inventive compound according to Example 1 | | | Compound according to German OS 25 32 469 - Example 1 | | |
|---|---|---|---|---|---|---|
| | ml | | | | | |
| After x Days | Aqueous Phase | Emulsion | Oil | Aqueous Phase | Emulsion | Oil |
| 8 | 25 | 74 | 1 | 47 | 52 | 1 |
| 10 | 30 | 68.5 | 1.5 | 50 | 48.5 | 1.5 |
| 15 | 40 | 58 | 2 | 55 | 43 | 2 |
| 20 | 46 | 51.5 | 2.5 | 60 | 37.5 | 2.5 |

EXAMPLE 9

Crude oil B; distilled water, 1 weight % of betaine added; temperature +25° C.

| | Inventive Compound according to Example 4 | | | Compound according to German OS 25 32 469 - Example 1 | | |
|---|---|---|---|---|---|---|
| | ml | | | | | |
| After x Days | Aqueous Phase | Emulsion | Oil | Aqueous Phase | Emulsion | Oil |
| 8 | 25 | 73 | 2 | 47 | 52 | 1 |
| 10 | 26 | 71.5 | 2.5 | 50 | 48.5 | 1.5 |
| 15 | 27 | 70 | 3 | 55 | 43 | 2 |

EXAMPLE 10

Crude oil B; synthetic deposit water; 1 weight % betaine added; temperature +25° C.

| | Inventive Compound according to Example 6 | | | Compound according to German OS 25 32 469 Example 1 | | |
|---|---|---|---|---|---|---|
| | ml | | | | | |
| Afer x Days | Aqueous Phase | Emulsion | Oil | Aqueous Phase | Emulsion | Oil |
| 2 | no phase separation | | | 14 | 85.5 | 0.5 |
| 4 | no phase separation | | | 23 | 76.5 | 0.5 |
| 6 | no phase separation | | | 26 | 73.9 | 0.1 |
| 8 | no phase separation | | | 27 | 72.9 | 0.1 |

EXAMPLE 11

Crude oil A; distilled water; 1 weight % of betaine added; temperature +25° C.

| After x Days | Inventive Compound according to Example 4 | | | Compound according to German OS 25 32 469 Example 1 | | |
|---|---|---|---|---|---|---|
| | ml | | | | | |
| | Aqueous Phase | Emulsion | Oil | Aqueous Phase | Emulsion | Oil |
| 2 | 14 | 85.5 | 0.5 | 21 | 78.5 | 0.5 |
| 4 | 23 | 76.9 | 0.1 | 30 | 69.9 | 0.1 |
| 6 | 26 | 73.9 | 0.1 | 32 | 67.9 | 0.1 |
| 8 | 26 | 73.85 | 0.15 | 33 | 66.85 | 0.15 |
| 10 | 27 | 72.8 | 0.2 | 34 | 65.8 | 0.2 |

EXAMPLE 12

In order to determine the limiting concentration, the inventive sulfobetaine of Example 1 was dissolved in the synthetic deposit water and the concentration was determined at which the interfacial tension between the aqueous solution and the crude oil A was less than 2 dynes/cm. In a comparison trial, the compound of the German Offenlegungsschrift No. 25 32 469 was dissolved in the simulated sea water. In the case of the inventively prepared sulfobetaine of Example 1, it turned out that a limiting value of less than 2 dynes/cm was measured at a concentration of $1.9 \times 10^{-3}$ weight %; in the case of the comparison substance of Example 1 of the German Offenlegungsschrift No. 25 32 469, the analogous concentration was $0.2 \times 10^{-2}$ weight %.

What is claimed is:

1. In a method for recovering mineral oil from deposits thereof by flooding the deposit with an aqueous solution and recovering the oil from the flooding solution, the improvement which comprises flooding the deposit with an aqueous solution containing from about 0.0005 to 5 weight percent of a sulfobetaine having the formula

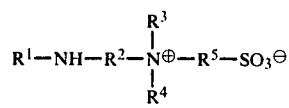

wherein
$R^1$ is a naphthenoyl residue,
$R^2$ is an alkyl residue with 2 to 6 carbon atoms,
$R^3$ and
$R^4$ may be the same or different and represent linear alkyl residues with 1 to 4 carbon atoms,
$R^5$ is an alkylene residue with 1 to 4 carbon atoms.

2. The method of claim 1 wherein $R^2$ contains 2 or 3 carbon atoms.

3. The method of claim 1 or 2 wherein $R^3$ and $R^4$ contain 1 or 2 carbon atoms.

* * * * *

UNITED STATES PATENT OFFICE
CERTIFICATE OF CORRECTION

Patent No. 4,259,191   Dated   March 31, 1981

Inventor(s) Helmut Wagner

It is certified that error appears in the above-identified patent and that said Letters Patent are hereby corrected as shown below:

In the heading of the patent [30] should read as follows:

[30]   Foreign Application Priority Data

August 12, 1977   Germany........P 27 36 408.5

Signed and Sealed this

First Day of September 1981

[SEAL]

Attest:

GERALD J. MOSSINGHOFF

Attesting Officer   Commissioner of Patents and Trademarks